Patented Mar. 7, 1950

2,499,431

UNITED STATES PATENT OFFICE 2,499,431

ANTHRAQUINONE ACID DYESTUFFS

Curt G. Vogt, Union, N. J., assignor to General Aniline & Film Corporation, New York, N. Y., a corporation of Delaware No Drawing. Application December 12, 1946, Serial No. 715,627

2 Claims. (Cl. 260—374)

The present invention relates to new compounds of the anthraquinone series, more particularly to new acid wool dyestuffs capable of dyeing in greenish-blue shades.

The new compounds have the general formula:

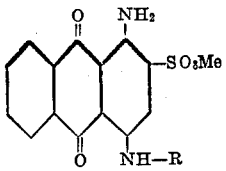

wherein Me is hydrogen, an alkali metal or ammonium and R is fluorenyl or substituted fluorenyl wherein the substituents are in one or both of the benz nuclei and may be halogen, e. g., chlorine, bromine, etc., alkyl, e. g., methyl, ethyl, propyl, butyl, etc., alkoxy, e. g., methoxy, ethoxy, propoxy, butoxy, etc., and aralkyl, e. g., benzyl, phenylethyl, etc. These substituents being in the benz nuclei are designated herein as ar-substituents.

For the preparation of the new dyestuffs a 1-amino-4-halogen-anthraquinone-2-sulfonic acid or a salt thereof is condensed with the corresponding fluorenamine, unsubstituted or ar-substituted as aforedefined. Fluorenamines which may be so employed are, for example, 2, 3 and 9-aminofluorene, 7 - chloro - 2 - aminofluorene, 7-bromo-2-aminofluorene, 2-bromo-7-aminofluorene, 3,7-dibromo-2-aminofluorene, 7-methyl-2-aminofluorene, 7-isobutyl-2-aminofluorene, 2-methoxy-3-aminofluorene, 7-benzyl-2-aminofluorene, etc.

The condensation reaction for the preparation of the dyestuffs is carried out by heating an aqueous solution of the 1-amino-4-halogen-anthraquinone-2-sulfonic acid or of a salt thereof in admixture with a solution of the fluorenylamine in a water-miscible organic solvent such as ethanol in the presence of a catalyst for the condensation such as copper or a copper salt and an acid binding agent such as sodium or potassium bicarbonate. To insure obtaining the product in the highest state of purity, the reaction is preferably carried out with exclusion of air from the hot reaction mixture. This may be accomplished by conducting the reaction in an atmosphere of an inert gas such as nitrogen or carbon dioxide or the like.

The dyestuffs contain but one sulfo group and as the free acid or as the alkali metal or ammonium salt are compounds of very limited solubility in water. They may be applied to the dyeing of animal or nylon (linear superpolyamide) fibers in the form of aqueous dispersions prepared from the compounds previously dispersed in a suitable medium such as lignin sodium sulfonate. Thus applied, the compounds dye wool or nylon from acid or neutral bath in greenish-blue shades of good fastness to light, washing and crocking, these fastness properties being the stronger in the nylon dyeings.

In view of the fact that the dyestuffs of the present invention are capable of dyeing animal and nylon fibers from neutral bath they are valuable in the union dyeing of textiles, for example, in the dyeing of mixed fibers of wool and cotton or nylon and cotton, the wool and nylon in each case being dyed a greenish-blue shade whereas the cotton, which remains undyed, is not tendered as would occur where an acid solution is employed.

The invention is further illustrated by the following example to which, however, it is not intended that it be limited. Parts are by weight.

Example

A mixture of 20.2 parts 1-amino-4-bromoanthraquinone-2-sulfonic acid, sodium salt (60-mesh), 10 parts sodium bicarbonate, 1.5 parts cuprous chloride and 250 parts water is placed in a reaction vessel equipped with a stirrer, thermometer and reflux condenser. To this mixture is slowly added a solution of 13.5 parts of 2-fluorenamine in 144 parts of warm ethanol. The mixture is heated, with stirring, to reflux and maintained at this temperature for 3 hours. At this time, a sample of the mixture viewed through the low-power of a microscope shows very fine greenish-blue crystals. The reaction mixture is concentrated by distillation. After 70 parts of distillate are removed, the residue is cooled and filtered. The precipitate is added to 800 parts of water at 85° C. with stirring, then 30 parts of 10% hydrochloric acid is added. The solids are recovered by filtration. The sludging process may be repeated if desired. The precipitated dyestuff after drying, amounts to 23 parts.

The dyestuff was admixed with lignin sodium sulfonate, kneaded to dryness in a Werner-Pfleiderer mill and the resultant powder dispersed in water. The dispersed product dyes wool and nylon from a neutral or acid aqueous bath in beautiful greenish-blue shades, the fastness to light, washing and crocking of the dyeing on wool being good and on nylon very good.

I claim:

1. An aminoanthraquinone compound of the general formula:

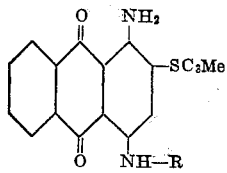

wherein R is a member selected from the group consisting of fluorenyl and ar-halogen, ar-alkyl, ar-alkoxy and ar-aralkyl fluorenyl, and Me is selected from the group consisting of hydrogen, alkali metal and ammonium.

2. An aminoanthraquinone compound of the general formula:

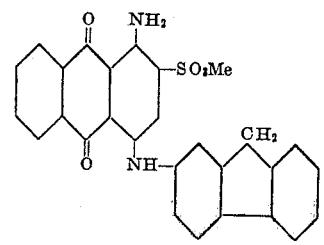

wherein Me is a member selected from the group consisting of hydrogen, alkali metal and ammonium.

CURT G. VOGT.

REFERENCES CITED

The following references are of record in the file of this patent:

FOREIGN PATENTS

| Number | Country | Date |
|---|---|---|
| 568,567 | Germany | Jan. 20, 1933 |